United States Patent
Cho et al.

(10) Patent No.: US 8,636,399 B2
(45) Date of Patent: *Jan. 28, 2014

(54) BACKLIGHT ASSEMBLY

(71) Applicant: Samsung Display Co., Ltd, Yongin (KR)

(72) Inventors: Joo-Woan Cho, Asan-si (KR);
Sung-Kyu Shim, Seoul (KR);
Sang-Hoon Lee, Daejeon (KR);
Joo-Young Kim, Cheonan-si (KR);
Taek-Sun Shin, Asan-si (KR); Jin-Hee Park, Cheonan-si (KR); Kwang-Wook Choi, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,307

(22) Filed: Oct. 29, 2012

(65) Prior Publication Data
US 2013/0051077 A1   Feb. 28, 2013

Related U.S. Application Data

(63) Continuation of application No. 12/784,361, filed on May 20, 2010, now Pat. No. 8,297,823.

(30) Foreign Application Priority Data

Nov. 30, 2009   (KR) .......................... 10-2009-0116409

(51) Int. Cl.
*F21V 7/22* (2006.01)
(52) U.S. Cl.
USPC .......... 362/606; 362/634; 362/633; 362/613; 349/58

(58) Field of Classification Search
USPC .............................. 362/606, 633, 634; 349/58
See application file for complete search history.

(56) References Cited

U.S. PATENT DOCUMENTS 7,333,163 B2   2/2008  Huang et al.
7,515,220 B2 *  4/2009  Ko et al. ........................ 349/58

(Continued)

FOREIGN PATENT DOCUMENTS

JP        11-337942 A      12/1999
KR    1020050015368 A      2/2005

(Continued)

OTHER PUBLICATIONS

Partial European Search Report corresponding to EP10006226, Nov. 4, 2010, 7 pages.

*Primary Examiner* — Anabel Ton
(74) *Attorney, Agent, or Firm* — Innovation Counsel LLP

(57) ABSTRACT

A backlight assembly includes a plurality of point light sources, a light guide plate ("LGP") and a printed circuit board ("PCB"). The LGP has a light incident face in which light is incident, a side surface extending from an edge portion of the light incident face, and a fixing groove which is formed from the side surface toward an inner portion thereof. The PCB includes a point light source disposing portion in which the point light sources are disposed along a first direction, an extending portion extending from the point light disposing portion along a second direction substantially perpendicular to the first direction, and a protrusion which is fixed at an end portion of the extending portion. The protrusion of the PCB is coupled with the fixing groove of the LGP.

15 Claims, 8 Drawing Sheets

(56) References Cited

U.S. PATENT DOCUMENTS

| | | | |
|---|---|---|---|
| 7,839,465 B2 * | 11/2010 | Jung et al. | 349/58 |
| 7,855,761 B2 * | 12/2010 | Watanabe et al. | 349/58 |
| 8,297,823 B2 * | 10/2012 | Cho et al. | 362/606 |
| 2002/0080298 A1 | 6/2002 | Fukayama | |
| 2007/0052880 A1 | 3/2007 | Lv et al. | |
| 2009/0185099 A1 | 7/2009 | Watanabe et al. | |

FOREIGN PATENT DOCUMENTS

| | | |
|---|---|---|
| KR | 1020070000855 A | 1/2007 |
| KR | 1020070048516 A | 5/2007 |
| KR | 1020070077844 A | 7/2007 |
| KR | 1020070097676 A | 10/2007 |
| KR | 1020070101517 A | 10/2007 |
| KR | 1020080004006 A | 1/2008 |
| KR | 1020090011672 A | 2/2009 |

* cited by examiner

BACKLIGHT ASSEMBLY

PRIORITY STATEMENT

This application is a continuation of U.S. patent application Ser. No. 12/784,361 filed on May 20, 2010 which claims priority under 35 U.S.C. §119 to Korean Patent Application No. 2009-116409, filed on Nov. 30, 2009 in the Korean Intellectual Property Office (KIPO), the contents of which are herein incorporated by reference in their entirety.

BACKGROUND OF THE INVENTION

1. Field of the Invention

Example embodiments of the present invention relate to a backlight assembly. More particularly, example embodiments relate to a backlight assembly capable of enhancing light efficiency and maintaining uniform display luminance.

2. Description of the Related Art

Liquid crystal display ("LCD") devices are one of the most widely used types of flat panel display devices. LCD devices include a display substrate on which electric field generating electrodes, such as a first pixel electrode and a second pixel electrode, are formed, and an opposite substrate. The opposite substrate is positioned opposite to the display substrate. Moreover, LCD devices include a liquid crystal ("LC") layer interposed between the display substrate and the opposite substrate, and together, the two substrates and LC layer form the LCD panel portion of the LCD device. LCD devices display images by applying voltages to the electric field generating electrodes in the LCD panel, which cause an electric field to be generated across the LC layer. The electric field controls the orientation of the LC molecules in the LC layer, which affects the polarization of light passing therethrough.

Because the LCD panel of an LCD device is a non-light-emitting device that is not capable of emitting light on its own, a light source is required for the LCD device to display images. Light sources commonly used in LCD devices include, for example, light-emitting diodes ("LED"), cold cathode fluorescent lamps ("CCFL"), flat fluorescent lamps ("FFL"), etc.

The light source is incorporated into a backlight assembly, which is placed next to the LCD panel. Conventional LCD devices typically employ an edge illumination type backlight assembly. The edge illumination type backlight assembly includes a plurality of LEDs and a light guide plate ("LGP"). The LEDS are disposed along a side of the LGP. In the edge illumination type backlight assembly, the LEDs along a side of the LGP emit light, and the emitted light is incident into the LGP. The LGP then guides the light provided from the LEDS through the LGP such that the light is incident into the LCD panel. The distance that light travels from a light emission surface of the LEDs to a side, incident surface of the LGP is referred to as an "incident light distance." The incident light distance is not uniformly maintained due to elasticity of the LGP, which may contract or expand in accordance with a surrounding temperature and moisture content of ambient air.

The above information disclosed in this Background section is only for enhancement of understanding of the background of the invention and therefore it may contain information that does not form the prior art that is already known to a person of ordinary skill in the art.

SUMMARY OF THE INVENTION

In one aspect an edge illumination type backlight assembly in which a distance between a light emission surface of a light-emitting diode and a side surface of a light guide plate is uniformly maintained is provided.

Accordingly, a backlight assembly includes a plurality of point light sources, a light guide plate ("LGP") and a printed circuit board ("PCB") is provided. The point light sources emit light and are aligned in a first direction. The LGP has a light incident face in which the lights are incident, a side surface extending from an edge portion of the light incident face, and a fixing groove which is formed from the side surface toward an inner portion thereof The PCB includes a point light source disposing portion in which the point light sources are disposed, an extending portion extending from the point light disposing portion along a second direction that is substantially perpendicular to the first direction, and a protrusion which is fixed at an end portion of the extending portion. The protrusion of the PCB is coupled with the fixing groove of the LGP.

According to another aspect, a backlight assembly includes a plurality of point light sources, a light source module cover, an LGP and a receiving container. The point light sources emit light in a first direction. The light source module cover includes a light source fixing portion fixing the point light sources, an extending portion extending from the light source fixing portion and an LGP fixing portion formed at the extending portion. The LGP has a light incident face disposed adjacent to the point light sources, a side surface extending from a short side of the light incident face along the first direction, a light exit face extending from a long side of the light incident face along the first direction, and a light reflection face opposite to the light exit face to diffuse and reflect light which enters the LGP at the light incident face. The receiving container includes a bottom plate supporting the light source module cover and the LGP, and a side wall formed at an edge of the bottom plate. A fixing groove receiving the LGP fixing portion is formed at a side surface of the LGP, and the light source module cover is overlapped with the LGP and moves independently from the bottom plate.

Detailed descriptions of example embodiments are described in the specification and drawings.

BRIEF DESCRIPTION OF THE DRAWINGS

The above and other features and advantages will become more apparent by describing in detailed example embodiments with reference to the accompanying drawings, in which.

DETAILED DESCRIPTION OF THE INVENTION

Figure 1:
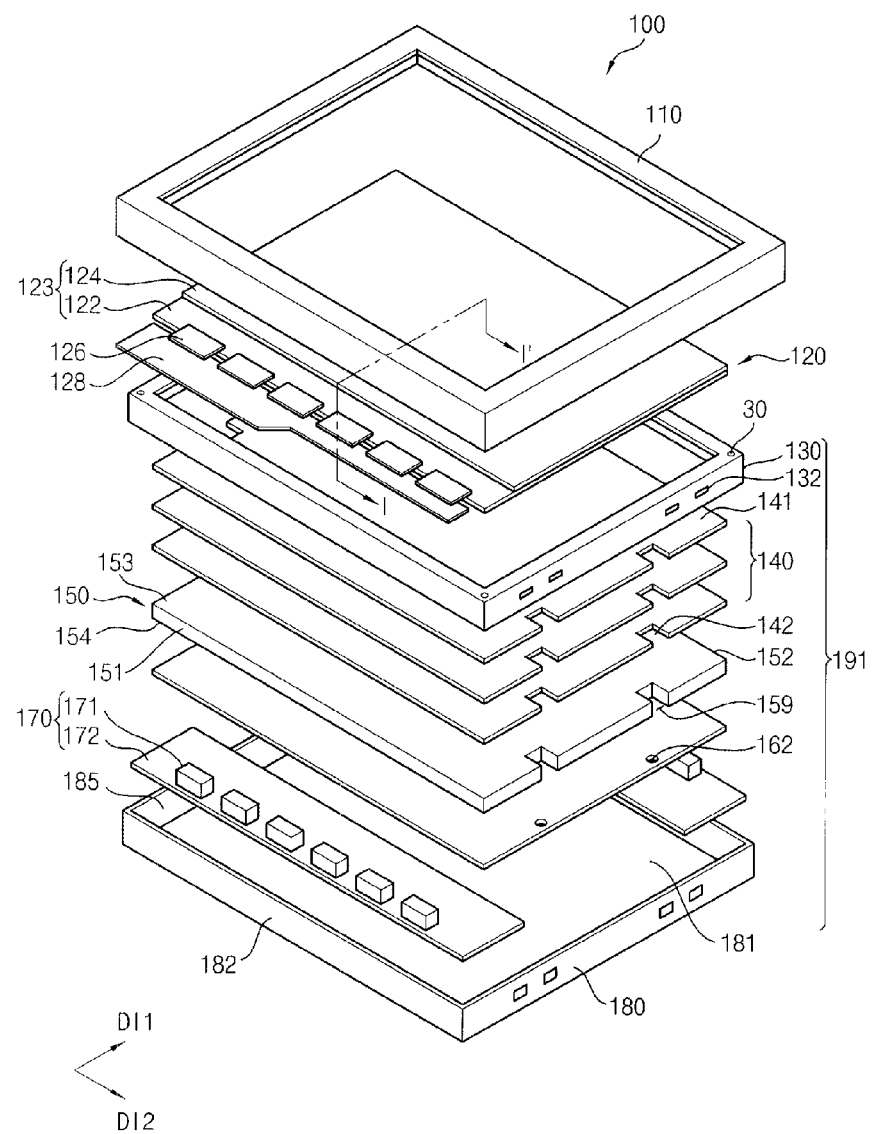
FIG. 1 is a perspective view illustrating a liquid crystal display ("LCD") device including a conventional edge illumination type backlight assembly.

The present invention is described more fully hereinafter with reference to the accompanying drawings, in which example embodiments are shown. The present invention may, however, be embodied in many different forms and should not be construed as limited to the example embodiments set forth herein. Rather, these example embodiments are provided so that this disclosure will be thorough \, and will convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s), as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, etc. but do not preclude the presence or addition of one or more other features, integers, steps, operations, elements, components, etc. and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to FIGS. 1 to 10.

Figure 2:
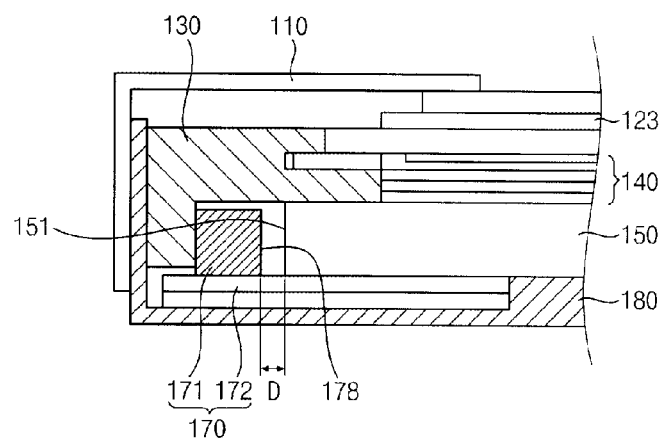
FIG. 2 is a cross-sectional view taken along a line I-I' of the LCD device of FIG. 1.

FIG. 1 is a perspective view illustrating a liquid crystal display ("LCD") device 100 including a conventional edge illumination type backlight assembly 191. FIG. 2 is a cross-sectional view taken along a line I-I' of the LCD device 100 of FIG. 1.

Referring to FIGS. 1 and 2, a light guide plate ("LGP") 150 has a light incident face 151 in which light generated from a light source module 170 is incident, an opposite face 152 opposite to the light incident face 151, a light exit face 153 connecting the light incident face 151 and the opposite face 152 to emit lights toward an LCD panel, and a reflection face 154 opposite to the light exit face 153.

The LGP 150 guides light generated by the light source module 170 from the light source module 170, which is disposed at a first side of the LGP 150, toward the LCD panel. Light that is incident at a first side surface of the LGP 150 passes into and through the LGP 150 and arrives at an upper surface or a lower surface of the LGP 150. When the light arrives at the upper surface or lower surface of the LGP 150 at an incident angle to the surface that is no less than a threshold angle of the LGP 150, such light is not emitted toward an outside of the LGP 150, but instead is fully reflected at the surface of the LGP 150. Such reflected light is uniformly dispersed in an inner portion of the LGP 150. In this case, the LGP 150 may have a plate shape. The LGP 150 may include an optically transparent material such as a plastic based material. Examples of materials appropriate for the LGP 150 include acrylic resin such as polymethyl methacrylate (PMMA) and poly carbonate (PC) having a heat resistance superior to that of the PMMA.

The light source module 170 includes a plurality of point light sources 170 which emit light to a first side surface of the LGP 150, and a point light source printed circuit board ("PCB") 172 in which a plurality of circuit patterns that apply a driving power to the point light sources 170 are formed. One of the point light source PCBs 172 is disposed at a first side of the LGP 150, and the other of the point light source PCBs is disposed at a second side of the LGP 150. The point light source 171 may be a light-emitting diode ("LED"). In this case, the light source module 170 may include a plurality of LEDs 171 and a PCB 172 for driving the LEDs 171. The LEDs 171 are mounted on the PCB 172. A plurality of circuit patterns (not shown), which are electrically connected to each of the LEDs 171 to apply a driving current to the LED 171, are formed on the PCB 172. The PCB 172 may have a rectangular shape that has two short sides along a first direction DI1 and two long sides along a second direction DI2.

The LEDs 171 are disposed on the PCB 172 to be spaced apart from each other along a long side of the PCB 172. For example, each of the LEDs 171 may include a white LED. For another example, each of the LEDs 171 may include a red LED, a green LED and a blue LED. In this case, the red LED, the green LED and the blue LED are grouped to emit a white light. For convenience of description, it will be assumed that the LED 171 is a white LED.

In a structure in which the light source module 170 and the receiving container 180 are affixed to each other, because the LGP 150 may contract or expand in accordance with changes in the surrounding temperature and moisture content, the distance incident light travels from the LED 171 to the light incident face 151 of the LGP 150 on which light is incident can be variable.

The distance incident light travels from the LED 171 to the light incident face 151 (the "incident light distance") is preferably optimized in accordance with light incident efficiency, which is the ratio of an amount of light emitted by the light source to the amount of light that is incident into the face of the LGP 150 and with the state of the LGP 150 under a set of conditions, for instance temperature or moisture. However, although the incident light distance may be optimized for a particular set of conditions, the LGP 150 can contract or expand due to changes in external variables such as surrounding temperature or moisture content, so that an optimum distance is not maintained but is variable. Particularly, when the thickness of the LGP 150 is reduced, so that the LGP is relatively thin, the LGP 150 is more affected by the external variables, so that it is impossible to control the incident light distance. For example, when the LGP 150 absorbs heat generated from the LED 171, or a volume of a face in which light is incident, including light incident face 151 of the LGP 150, is expanded due to an increase of moisture content, light incident face 151 moves relative to an upper face 178 of the LED 171, so that the incident light distance is decreased with respect to the optimum distance. On the contrary, when the volume of the portion of the LGP on which light is incident, such as light incident face 151, is contracted due to a low surrounding temperature or a low level of moisture content, the incident light distance is increased with respect to the optimum distance. When the incident light distance is gradually decreased, light incident efficiency may be increased.

Figure 3:
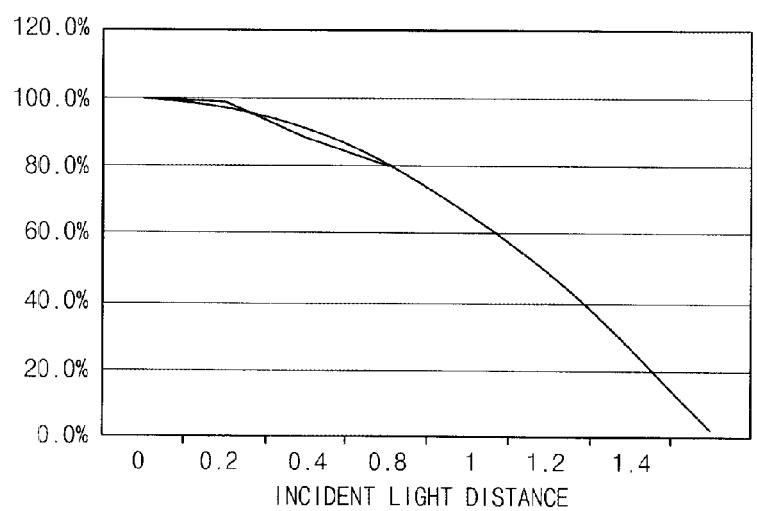
FIG. 3 is a graph showing a relationship between the distance incident light travels for a light source module and the incident light efficiency.

FIG. 3 is a graph showing light incident efficiency in accordance with incident light distance between the upper face 178 of the LED 171 disposed at the light source module 170 and the light incident face 151 of the LGP 150. The light incident efficiency is denoted as a ratio of amount of the light incident into light incident face 151 of the LGP 150 with respect to amount of the light exiting the light source 170. The incident light distance is in inverse proportion to the light incident efficiency. As shown in FIG. 3, the ratio of light incident into light incident face 151 is increased when the incident light distance is gradually decreased, and the light incident efficiency is rapidly decreased when the incident light distance is gradually increased. Thus, when light incident face 151 of the LGP 150 is disposed close to the LED 171, so as to enhance light incident efficiency of the LCD device 100, light incident efficiency may be increased.

However, in this case, the LGP 150 is expanded due to heat generated from the LED 171, so that light incident face 151 of the LGP 150 may contact a light emission surface 178 of the LED 171. As a result, the LED 171 may be damaged by mutual friction between light incident face 151 of the LGP 150 and the light emission surface 178 of the LED 171. In addition, reliability problems such as deterioration of display quality may be caused when portion LGP 150 in which light is incident heats and condenses, so that it becomes bent, or an end portion of an optical sheet disposed at the portion of the LGP 50 in which light is incident may become bent or wrinkled. The bending and/or wrinkling of the LGP 50 or optical sheet disposed on the LGP 50 may cause to light leakage or luminance disuniformity, and thus result in deterioration of display quality. That is, the light incident efficiency and the reliability problem according to the incident light distance are in a trade-off relationship. Thus, when an optimum incident light distance which satisfies the light incident efficiency of the light source and the reliability of the LCD device 100 is obtained, it is preferable that the optimum incident light distance is uniformly maintained.

Figure 4:
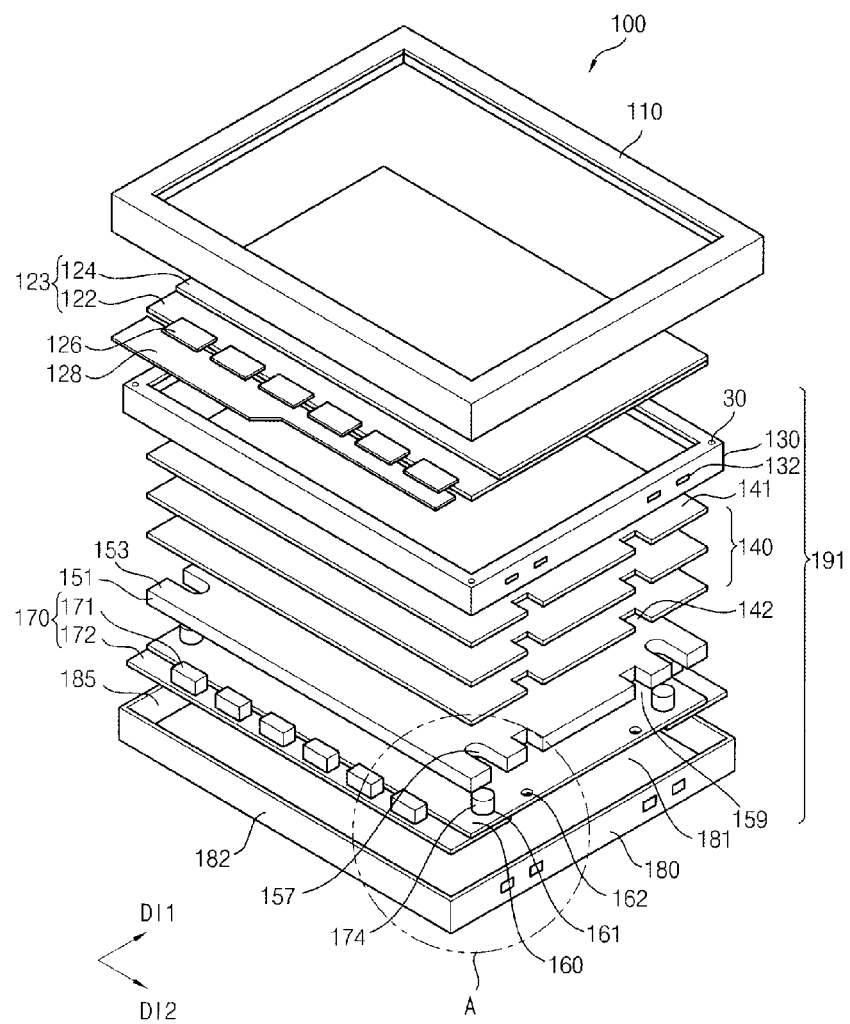
FIG. 4 is an exploded perspective view schematically showing an LCD device including a backlight assembly according to an example embodiment.

FIG. 4 is an exploded perspective view schematically showing a liquid crystal display device 200 including a backlight assembly according to an example embodiment. The LCD device 200 of the present example embodiment includes substantially identical elements of the LCD device 100 of FIG. 1 except for a structure of the backlight assembly 191. That is, the LCD panel 200 according to the present example embodiment includes an LCD panel assembly 120 and a backlight assembly 191.

The LCD panel assembly 120 includes an LCD panel 123, a chip film package 126, a source printed circuit board ("PCB") 128, etc.

The LCD panel 123 includes a lower display plate 122, an upper display plate 124 opposite to the lower display plate 122, and a liquid crystal layer (not shown) is interposed between the lower display plate 122 and the upper display plate 124. The LCD panel 123 is disposed on the backlight assembly 191 to display image information by using light provided from the backlight assembly 191.

The chip film package 126 may be connected to data lines (not shown) formed on the lower display plate 122 to provide each of the data lines with a data driving signal. A gate driving part may be connected to each of gate lines (not shown) formed on the lower display plate 122 to provide each of the gate lines with a gate driving signal. For one example, the gate driving part may be formed in an integrated circuit. For another example, the gate driving part may be formed in the chip film package 126. Alternatively, various driving elements processing a gate driving signal which is input to the data driving part and a data driving signal which is input to the chip film package 126 may be mounted on the source PCB 127.

The backlight assembly 191 includes optical sheets 140, a mold frame 130, a light guide plate 150, a reflection plate 160, a first light source module 170a, a second light source module 170b (FIG. 5), a lower receiving container 180, etc. The optical sheets 140, the reflection plate 160 and the mold frame 130 will be described later.

Figure 5:
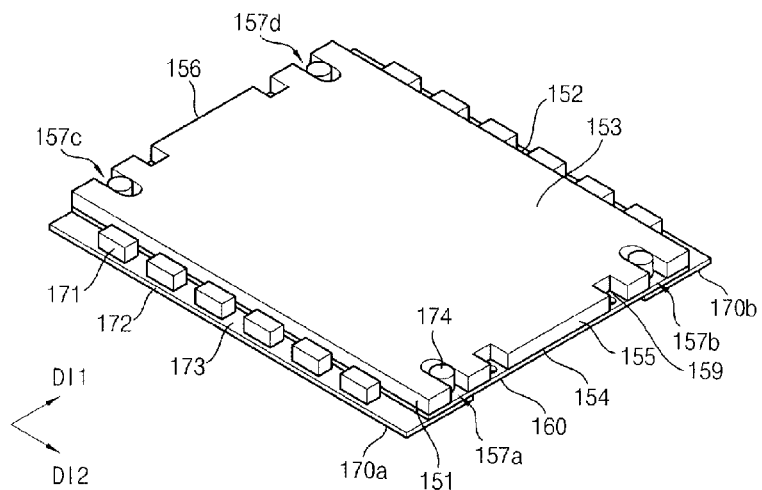
FIG. 5 is a perspective view showing a coupling relationship between first and second light source modules and a light guide plate.

FIG. 5 is a perspective view showing a coupling relationship between first and second light source modules 170a and 170b and an LGP 150 (FIG. 1).

Referring to FIGS. 4 and 5, the first and second light source modules 170a and 170b are respectively disposed at a first portion of the LGP 150 and a second portion facing the first portion of the LGP 150 along a first direction DI1. In a light disposing structure, in order to emit uniform lights to an entire of display panel, the LGP 150 may be formed so that it is flat and has a uniform thickness. Alternatively, a shape of the LGP 150 is not limited thereto, and the LGP may employ various shapes.

The LGP 150 has a light incident face 151 in which light generated from a light source module 170 is incident, an opposite face 152 opposite to the light incident face 151, a light exit face 153 connecting the light incident face 151 and the opposite face 152 to emit light toward an LCD panel, and a reflection face 154 opposite to the light exit face 153. Hereinafter, a description for a structure of the LGP 150 as previously described in reference to FIG. 1 will be omitted. The LGP 150 includes a first side surface 155 and a second side surface 156, which connect the light incident face 151 and the opposite face 152. The light incident face 151 and the opposite face 152 with respect to the first light source module 170a may also correspond to an opposite face and a light incident face, respectively, with respect to the second light source module 170b disposed at a second side of the LGP 150.

A plurality of diffusion patterns (not shown) is further formed on at least one surface of reflection face 154 and light exit face 153 of the LGP 150 so as to emit light propagating within the inner portion of the LGP 150 toward the LCD panel 123 positioned at an upper portion of the LGP 150. The diffusion patterns, which are formed at a first surface of the LGP 150 to make the luminance of light emitted from the LGP 150 uniform, may be formed to have different sizes and densities in accordance with their distance from the first and second light source modules 170a and 170b. For example, a density of the diffusion patterns or a size of the diffusion patterns is increased as the diffusion patterns are spaced further from the first and second light source modules 170, so that luminance of light emitted from the light exit face 153 may be uniform. The diffusion patterns may be formed through a silk screen printing process or a laser process, however, the present example embodiment is not limited to the process for forming diffusion patterns. For example, it is possible that fine grooves or fine protrusions are formed on the LGP 150 to form the diffusion pattern having an identical action and effect to the diffusion pattern formed through a silk screen printing process or laser process.

In FIG. 5, each of the first and second light source modules 170a and 170b includes a plurality of point light sources which emits light to a first side surface of the LGP 150, and a point light source PCB in which a plurality of circuit patterns applying a driving power to the point light sources is formed.

The PCB 172 for driving the LED 171 includes a base substrate, a circuit pattern formed on the base substrate, and an insulation layer (not shown) which prevents an electrical short between the circuit patterns. The circuit pattern is formed from an electrical material which is patterned to apply a driving current to the LED 171. For example, the base substrate may be configured in a rigid plate or a flexible film type in accordance with thickness and flexibility thereof. Moreover, the base substrate may be supported by a metal plate (not shown) to effectively irradiate heat generated from the LED 171. In this case, the metal plate may also provide mechanical stability to the light source module 170.

According to an example embodiment, in order to have an incident light distance of each of the light source modules 170 be uniform, a protrusion 174 is formed on an upper surface 173 of the PCB 172 of the light source module 170. As shown in FIG. 5, it is assumed that the PCB 172 of the first light source module 170a is a plane having a short side of a first direction DI1 and a long side of a second direction DI2, the protrusion 174 may be formed at an adjacent portion adjacent to two short sides of the PCB 172 of the first light source module 170a.

For example, the protrusion 174 may be positioned so that it is toward the LGP 150 from the PCB 172 on which the LED 171 is disposed. Moreover, the protrusion 174 may be disposed outside of a region in which the LEDs 171 are aligned, that is on a portion of PCB 172 that is outside of the portion that the LED 171 disposed at the most outer area of the light source module 170 is positioned. Furthermore, the protrusion 174 may be formed on the PCB 172 of the second light source module 170b in a symmetric manner with respect to the protrusions 174 of the PCB 172 of the first light source module 170a.

The protrusion 174 may be formed on the PCB 172 in a soldering process through a surface mounting method. In this case, the protrusion 174 may include a metal material which is capable of soldering. Alternatively, a penetration hole (not shown) is formed through the PCB 172 where the protrusion 174 is formed, and then a coupling member is coupled through the penetration hole to form the protrusion 174. In this case, the protrusion 174 may include a resin material.

The number of the protrusion 174 formed on the PCB 172 may be set within optical characteristics of the LGP 150. For example, a single protrusion 174 may be formed at two end portions of the PCB 172, respectively. In the present example embodiment, it is described that the shape of the protrusion 174 is a cylindrical shape. Alternatively, the shape of the protrusion 174 may be various shapes such as a rectangular shape, a hexagon pillar shape, etc.

In order to radiate heat generated from the LED 171, a heat radiating plate (not shown) of a heat conductive metal material such as copper (Cu), aluminum (Al), etc., may be further attached to the PCB 172 of an example embodiment. A heat radiating pattern (not shown) may be formed on the heat radiating plate so as to obtain uniform heat radiation. Moreover, in order to allow a rear surface of the PCB 172, which is described later, to move smoothly a heat conductive tape having a non-attaching characteristic may be attached on a rear surface of the PCB 172. Furthermore, in order to allow a rear surface of the PCB 172, which is described later, to move smoothly a thermal grease having high thermal conductivity may be coated on the rear surface of the PCB 172.

Hereinafter, referring again to FIGS. 4 and 5, in order to uniformly maintain an incident light distance of the light source module 170, a fixing groove 157 coupled with the protrusion 174 will be explained.

Referring to FIG. 5, the fixing groove 157 (as represented by fixing grooves 157a, 157b, 157c and 157d) is formed at an end portion of a side surface 155 and 156 connecting the light incident face 151 and the opposite face 152 of the LGP 150. In this case, the fixing groove 157 is formed at a first end portion of the first side surface. The fixing groove 157 may also be formed at two end portions of the first side surface. That is, the fixing grooves 157 may be formed at a position spaced apart from a tangent line in which the light incident face 151 and the first side surface are met with each other or the opposite face 152 and the first side surface are met with each other.

The fixing groove 157 is positioned so that an incident light distance which light incident efficiency of the light source module 170 is maximized. When the fixing grooves respectively formed adjacent to the light incident face 151 and the opposite face 152 are denoted as a first fixing groove 157a and a second fixing groove 157b, the first and second fixing grooves 157a and 157b may be disposed in a symmetric manner with respect to an imaginary line crossing a center of the LGP 150 in parallel with the second direction DI2.

Figure 6:
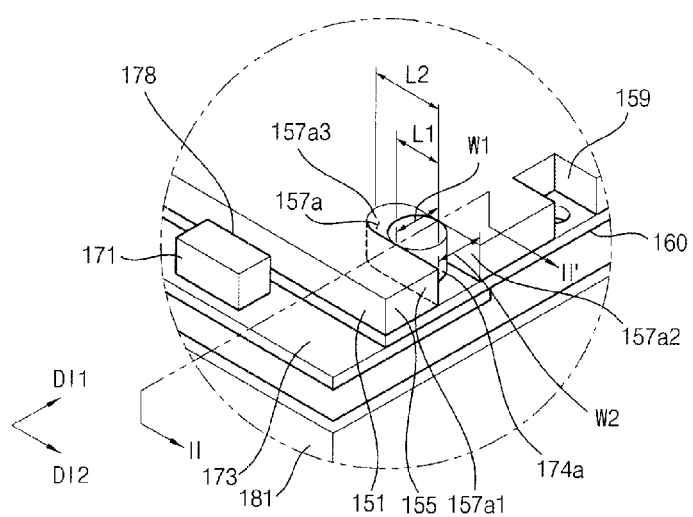
FIG. 6 is an enlarged perspective view showing a portion "A" in FIG. 4.
Figure 7A:
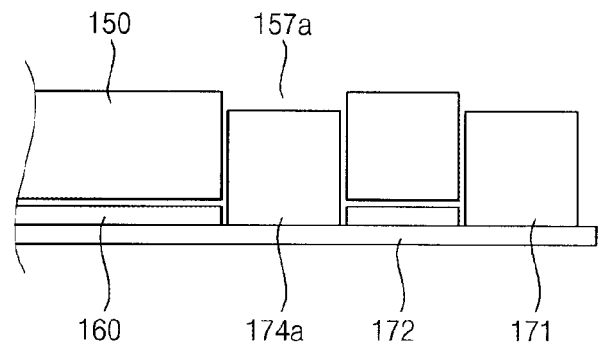
FIG. 7A is a partial cross-sectional view taken along a line II-II' of FIG. 6.

When the light source module 170 is disposed at two ends of the LGP 150, the first fixing groove 157a and the third fixing groove 157c may be formed through the LGP 150 with respect to the first light source module 170a, and the second fixing groove 157b and the fourth fixing groove 157d may be formed through the LGP 150 with respect to the second light source module 170b. FIG. 6 is an enlarged perspective view showing a portion "A" circled in FIG. 4. In FIG. 6, the coupling relationship between a protrusion 174 and a fixing groove 157 is enlarged and shown. FIG. 7A is a partial cross-sectional view taken along a line II-II' of FIG. 6.

In FIG. 4, it is assumed that the protrusion 174 of the first light source module 170a corresponding to the first fixing groove 157a is a first protrusion 174a. The first fixing groove 157a corresponding to the first protrusion 174a may have a width W2 along the first direction DI1 and a length L2 along the second direction DI2. In this case, the length L2 is greater than the width W2.

The LGP 150 is expanded in the first and second directions DI1 and DI2 due to surroundings thereof When the LGP 150 is expanded in the first direction DI1, the LGP 150 is coupled and fixed with the first protrusion 174a, attached to PCB 172, so that the PCB 172 moves with the expansion of the LGP 150, and the incident light distance may be maintained. When the LGP 150 is expanded in the second direction DI2, the LGP 150 is moves freely over the PCB 172. Thus, bending and contraction of the LGP 150 may be prevented. Therefore, in order to ensure there is room for the LBP 150 to expand or contract in the second direction DI2, the length L2 is typically greater than the width W2.

In the backlight assembly 190, a width W1 of the first protrusion 174a may be substantially equal to the width W2 of the first fixing groove 157a, so that the first protrusion 174a contacts with walls of the first fixing groove 157a so that they are coupled together. Alternatively, the width W1 of the first protrusion 174a may be slightly smaller than the width W2 of the first fixing groove 157a. When the LGP 150 is expanded in the first direction DI1 by surrounding temperature, moisture of ambient air and so on, the PCB 172 on which the LEDs 171 are mounted may be also moved by the expansion of the LGP 150 due to a coupling of the first protrusion 174a and the first fixing groove 157a, so that the incident light distance may be uniformly maintained.

Because the PCB 172 is not fixed to a bottom plate 181 of a lower receiving container 180, an interval distance between the light incident face 151 of the LGP 150 and a light emission surface 178 of the LED 171, that is, an incident light distance may be substantially maintained in a uniform manner. That is, a lower face of the PCB 172 moves independently from the bottom plate 181 of the lower receiving container 180 and moves dependently from the LGP 150. Thus, a distance between the light incident face 151 of the LGP 150 and a light emission surface 178 of the LED 171 is maintained in a uniform manner within an error range according to a variation of temperature and moisture, so that luminance uniformity or luminance intensity at a light exit face of the LGP 150 may be maintained in a uniform manner.

In addition, the widths W1 of the protrusion 174 and the widths W2 of the fixing grooves 157 may be set to have an optimum relationship with respect to a coupling tolerance. For example, the width of the fixing groove 157 formed through the LGP 150 is substantially greater than the width of the protrusion 174. In this case, the width of the fixing groove and the width of protrusion may be obtained in consideration with expanding ratio of the PCB 172.

The first fixing groove 157a according to an example embodiment is recessed from the first side surface 155 toward an inner portion of the LGP 150, as shown in FIG. 6. The first fixing groove 157a may have a first inner face 157a1, a second inner face 157a2 facing the first inner face 157a1, and a connection face 157a3 connecting the first and second inner faces 157a1 and 157a2.

The fixing groove 157 may, for instance, be a hole that penetrates the LGP 150 in an area adjacent to a side surface of the LGP 150, so that the protrusion 174 can fit into the hole. Alternatively, as shown in FIGS. 4, 5 and 6, the fixing groove 157 may be a groove, rather than a hole, so as to enhance assembly simplicity. The connection face 157a3 may be a curved surface in which a portion of an external surface of the first protrusion 174a is engaged. In the present example embodiment, the connection face 157a3 may have an arch type curved surface to correspond with the first protrusion 174a, which has a cylindrical shape. The connection face may have a planar surface or a curved surface of various shapes, and it is not limited to the present example embodiment.

The first protrusion 174a may be formed at a position on the LGP 150 that corresponds to the first fixing groove 157a. That is, the first protrusion 174a may be positioned on the LGP 150 at an outer area (i.e., a dead zone) of a radiation angle of the light emitted from the LED 171 that is positioned at the most outer area of the light source module 170. In case that he PCB has a narrower width along direction D11, the first protrusion 174a may be more closely positioned to an area adjacent to light incident face 151. Moreover, in order to disperse light incident into the LGP 150, a plurality of patterns may be further formed on a surface area of the first fixing groove 157a that is adjacent to the first protrusion 174a. In this case, the first protrusion 174a and the first fixing groove 157a are covered by the mold frame 130, which is disposed over the first fixing groove 157a, so that the patterns of the surface area of the first fixing groove 157a do not affected the display quality.

FIG. 7A is a partial cross-sectional view taken along a line II-II' of FIG. 6. That is, FIG. 7A shows a coupling relationship between the first protrusion 174a and the first fixing groove 157a.

Figure 7B:
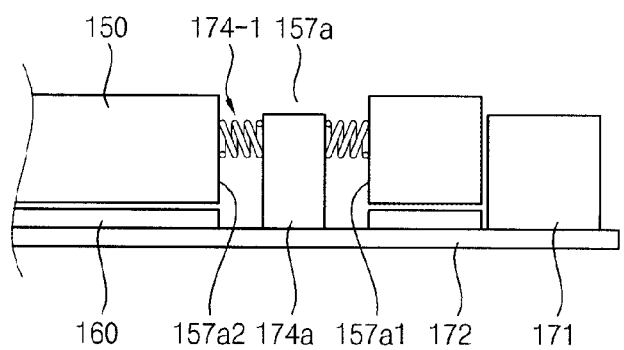
FIG. 7B is a partial cross-sectional view of a backlight assembly according to another example embodiment.

FIG. 7B is a partial cross-sectional view of a backlight assembly according to another example embodiment.

The backlight assembly of the present example embodiment is substantially the same as the backlight assembly of FIGS. 6 and 7A except for at least a coupling structure of a protrusion 174 and a fixing groove 157, and thus any repetitive detailed explanation may hereinafter be omitted.

The first protrusion 174a of the present example embodiment may have a shape in which an elastic member 174-1, such as a spring, is disposed at an exterior surface of a protrusion body. A first end portion of the elastic member 174-1 contacts with inner surfaces 157a1 and 157a2 of the first fixing groove 157a, so that the processing tolerance during formation of the first fixing groove 157a of the LGP 150 may be reduced. In this case, the first protrusion 174a contacts the first fixing groove 157a such that there is elasticity between the first protrusion 174a and the first fixing groove 157a. As a result, an incident light distance of the light source module 170 may be maintained. Moreover, since the elastic member 174-1 is employed with the first protrusion 174a, a displacement of the PCB and a displacement of the LGP will be substantially equal to each other, even though the PCB is contracted. Therefore, the incident light distance may be easily maintained.

Figure 7C:
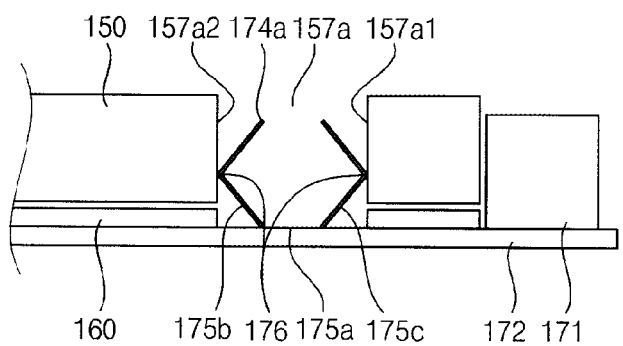
FIG. 7C is a partial cross-sectional view of a backlight assembly according to another example embodiment.

FIG. 7C is a partial cross-sectional view of a backlight assembly according to still another example embodiment.

The backlight assembly of the present example embodiment is substantially the same as the backlight assembly of FIGS. 6 and 7A except for at least a coupling structure of a protrusion 174 and a fixing groove 157. Thus, identical reference numerals are used in FIG. 7C to refer to components that are the same or like those shown in FIGS. 6 and 7A, and thus any repetitive detailed explanation may hereinafter be omitted.

The first protrusion 174a of the present example embodiment includes a flat plate shaped elastic member having protruding parts that face each other. The flat plate shaped elastic member includes a base portion 175a formed on an upper face of the PCB 172, a first protruding part 175b that protrudes from the base portion 175a and extends to a first inner side surface 157a1 of the first fixing groove 157a, and a second protruding part 175c that protrudes from the base portion 175a and extends to a second inner side surface 157a2 of the first fixing groove 157a. Each of the first and second protruding parts 175b and 175c has a bent portion 175c that contacts the first and second inner side surfaces 157a1 and 157a2. A shape of the flat plate shaped elastic member is not limited to the example embodiment illustrated in FIG. 7C, and it may be formed in various shapes. The bent portion 176 of the flat plate shaped elastic member contacts the first and second inner side surfaces 157a1 and 157a2 of the first fixing groove 157, thereby preventing development of an interval between the first protrusion 174a and the first fixing groove 157a that may occur due to a processing tolerance of the fixing groove 157 or external impact.

Figure 8A:
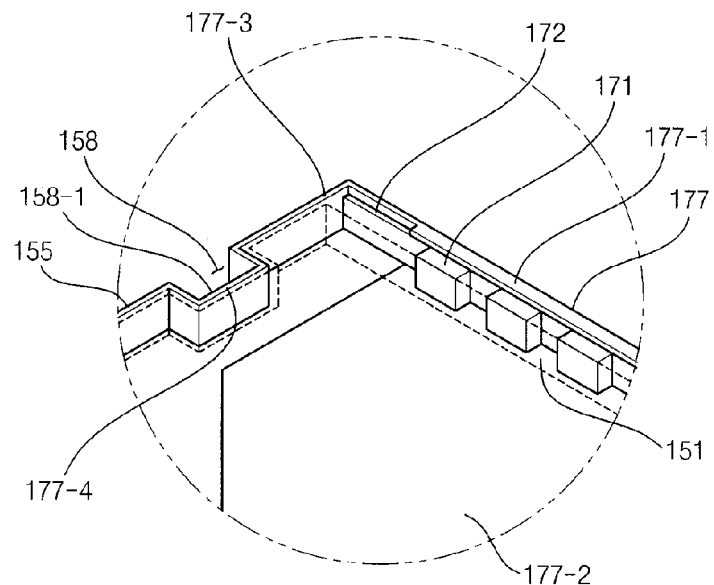
FIGS. 8A and 8B are partial perspective views of a backlight assembly according to another example embodiment.
Figure 8B:
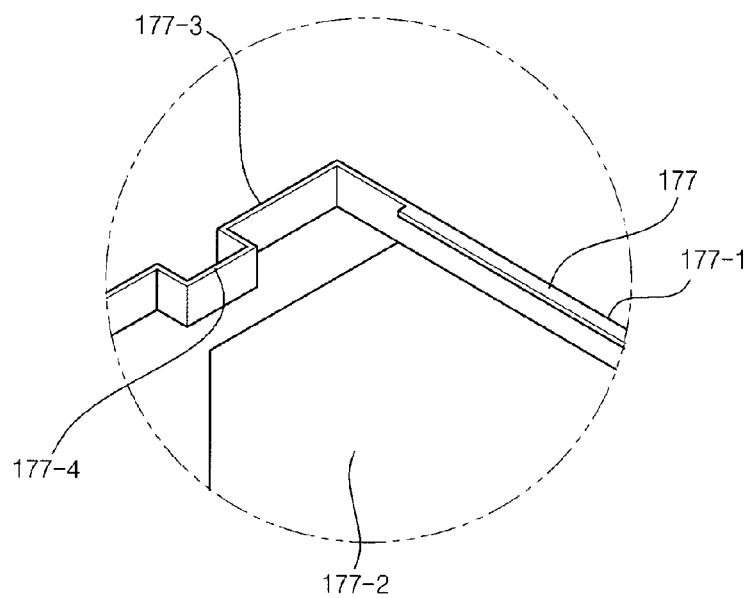

FIGS. 8A and 8B are partial perspective views of a backlight assembly according to further still another example embodiment.

The backlight assembly of FIGS. 8A and 8B is substantially the same as the backlight assembly of FIG. 4 except for at least a coupling structure of a light source module 170 and a light guide plate 150, and thus any repetitive detailed explanation may hereinafter be omitted.

The backlight assembly of FIG. 8A may further include a light source module cover 177 disposed at a rear surface of the light source module 170 including a plurality of light-emitting diodes 171 and a PCB 172.

The light source module 170 and the light source module cover 177 are affixed through an adhesive tape, a screw, and so on. The light source module cover 177 may be a metal plate which easily absorbs heat emitted from the LEDs and delivers the excess heat to an external portion thereof. A reflective material such as silver (Ag) may also be coated on the metal plate. In this case, the coated silver may reflect a white light emitted from the LED toward the light incident face 151 of the LGP 150 to enhance reflection efficiency.

In the PCB 172 of the present example embodiment, a first face in which a plurality of LEDs 171 are arranged in parallel with each other to face the light incident face 151 of the LGP 150.

FIG. 8B shows a structure of the light source module cover 177. Referring to FIG. 8B, the light source module cover 177 includes a support portion 177-1 in which the PCB 172 is disposed to fix the LEDs 171, a bottom portion 177-2 extending from an edge portion of the support portion 177-1, so as to be partially overlapped with the reflection face 154 of the LGP 150, and a coupling portion 177-3 that extends from a first portion of the support portion 177-1, so as to be formed along a first side wall 155 of the LGP 150.

The coupling portion 177-3 includes an LGP fixing portion 177-4 extending along an inner face 158-1 of a coupling groove 158 of the LGP 150 as shown in FIG. 8A. Since the coupling portion 177-3 of the light source module cover 177 is coupled with the coupling groove 158, an incident light distance of the light source module 170 may be maintained in a uniform manner. Shapes of the coupling portion 177-3 and the coupling groove 158 are not limited to that example embodiment of FIGS. 8A and 8B, and it may be deformed in various shapes.

Figure 9:
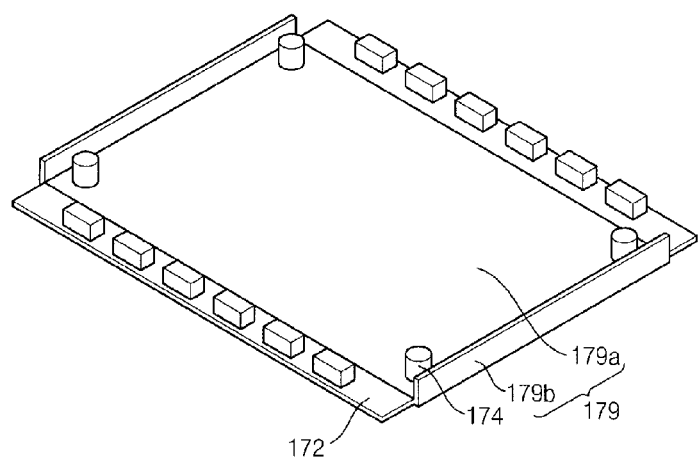
FIG. 9 is a perspective view of a backlight assembly according to another example embodiment.

FIG. 9 is a perspective view of a backlight assembly according to still another example embodiment.

Referring to FIG. 9, the backlight assembly of the present example embodiment is substantially the same as the backlight assembly of FIG. 4 except that a PCB 172 further includes a metal support structure 179, and thus any repetitive detailed explanation may hereinafter be omitted.

The PCB 172 of the backlight assembly of the present example embodiment may further include a metal support structure 179. The metal support structure 179 includes a horizontal portion 179a overlapping with the reflection face 154 of the LGP 150, and a vertical portion 179b bent from the horizontal portion 179a so as to be overlapped with the first and second side surfaces 155 and 156 of the LGP 150. In this case, a protrusion 174 may be formed on an edge portion of the horizontal portion 179a of the metal support structure 179 to be coupled with the fixing groove 157 of the LGP 150. The shape and position of the protrusion 174 are substantially the same as in the previous example embodiment, and thus a detailed description thereof will be omitted. Accordingly, the protrusion 174 is formed on the metal support structure 179 and the horizontal and vertical portions cover the LGP 150, thereby fixing the LGP 150 in a stable manner.

Figure 10:
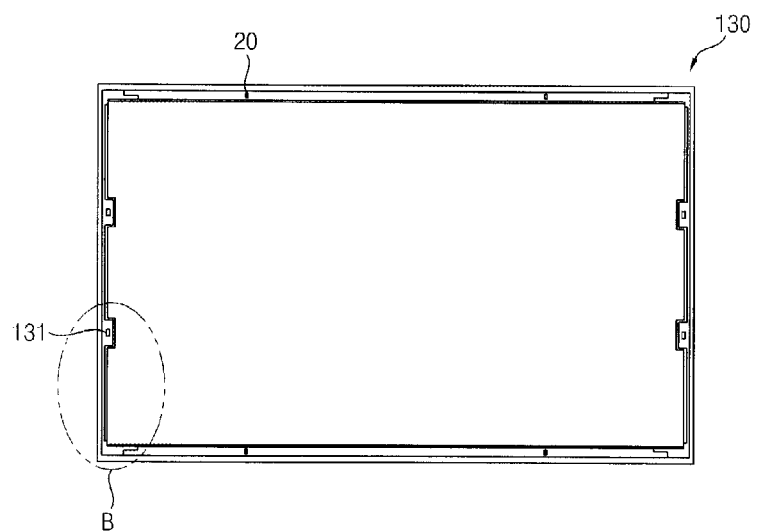
FIG. 10 is a plan view showing a mold frame of FIG. 4.

FIG. 10 is a plan view showing a mold frame of FIG. 4.

Figure 11:
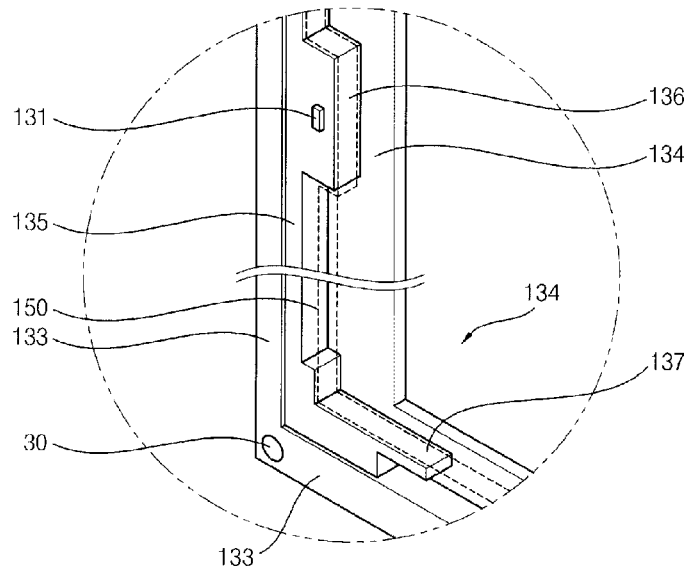
FIG. 11 is a partial enlarged perspective view showing a portion "B" in FIG. 10.

FIG. 11 is a partial enlarged perspective view showing a portion "B" in FIG. 10.

Hereinafter, the reflection plate 160, the optical sheets 140 and a lower receiving container 180 of the backlight assembly 190 will be explained in detail with reference to FIGS. 4, 10 and 11.

The reflection plate 160 is disposed between the reflection face 154 of the LGP 150 and the bottom plate 181 of the lower receiving container 180 to reflect light exiting through the reflection face 154 of the LGP 150 toward an upper portion thereof. The penetrating hole 161 (see FIG. 4) is formed in a portion corresponding to a position where the protrusion 174 is positioned on the PCB 172. The protrusion 174 is inserted through the penetrating hole 161, thereby enhancing assembly simplicity of the backlight assembly. The optical sheets 140 are disposed between the backlight assembly 191 and the LCD panel assembly 120 to increase light efficiency. Each of the optical sheets 140 may include an optical sheet body 141 and an optical sheet guide groove 142 formed at an edge of the optical sheet. The optical sheet guide groove 142 is coupled with a guide protruding portion of a mold frame 130 (which will be described later) to fix the optical sheet body to play a role of preventing movement of the optical sheet body. A structure of the optical sheets 140 is not limited to that example embodiment, and the structure of the optical sheets 140 may be varied in accordance with a specification of a display device. The lower receiving container 180 may include a bottom plate 181 having a rectangular shape and a plurality of side walls that extend from edges of the bottom plate 181 to form a receiving space. The side walls may include a first side wall 181 and a second side wall 183 that are parallel to each other along the first direction DI1 to face each other, a third side wall 184 and a fourth side wall 185 that are parallel to each other along the second direction DI2 to face each other. The PCB 172, the reflection plate 160, the LGP 150 and the optical sheets 140 are sequentially disposed in the receiving space of the lower receiving container 180.

In FIG. 10, the mold frame 130 includes a side portion 133 of a rectangular frame shape, a first support portion 134 (FIG. 11) that extends from the side portion 133 toward an inner portion thereof and a second support portion 135 that extends from the side portion 133 toward an inner portion thereof. An LCD panel is disposed on a first face of the first support portion 134, and optical sheets 140 and the LGP 150 are disposed on a second face of first support portion 134. The second support portion 135 is formed on a second face of the first support portion 134 to prevent the optical sheets 140 and the LGP 150 from shifting. The thickness of the second support portion 135 may be substantially equal to the total sum of the thickness of the optical sheets 140 and the thickness of the LGP 150. A guide protruding part 136 protruded from the second support portion 135 toward an inner portion of the mold frame 130 may control movement of the optical sheets 140 and the LGP 150. For example, the guide protruding part 136 of the mold frame 130 is inserted into a guide groove 142 formed through an end portion of the optical sheets 140 and a guide groove 159 formed through an end portion of the LGP 150.

The reflection plate 160 is disposed on the second support portion 135. In order to fix the reflection plate 160, a fixing pin 131 may be formed on a first face of the second support portion 135. In an example embodiment, it is explained that the fixing pin 131 is formed on the guide protruding part 136 of the second support portion 135; however, it is not limited to the present example embodiment. For example, the fixing pin 131 may be disposed at a predetermined position of the second support portion 135. The fixing pin 131 is inserted into an insert pin 162 of the reflection plate 160. Moreover, an additional fixing pin 20 that protrudes opposite to the reflection plate 160 may be formed on the first support portion 134 or the second support portion 135. In this case, the additional fixing pin 20 may suppress the reflection plate 160 to fix the reflection plate 160 to the bottom plate 181 of the lower receiving container 180.

A fixing protruding part 137 is formed at a corner portion of the mold frame 130, and protrudes from the second support portion 135 substantially in parallel with the side portion 133. An insertion space of a U-shape is defined between the fixing protruding part 137 and the side portion 135. A third side wall 184 and a fourth side wall 185 of the lower receiving container 180 are inserted into the insertion space to be fixed thereto. According to an example embodiment, the lower receiving container 180 and the mold frame 130 are coupled with each other to receive the optical sheets 140, the LGP 150 and the reflection plate 160. The first and second side walls 182 and 183 of the lower receiving container 180 are coupled with the mold frame 130 in a hook method. The third and fourth side walls 184 and 185 of the lower receiving container 180 are inserted into the insertion space of the mold frame 130, so that a coupling force between the mold frame 130 and the lower receiving container 180 may be sufficiently secured.

The foregoing is illustrative of the present invention and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A backlight assembly comprising:
a plurality of point light sources that emit light and are aligned along a first direction;
a light guide plate ("LGP") having a light incident face into which the light is incident, a side surface extending from an edge portion of the light incident face, and a fixing groove which is formed in the side surface, the fixing groove extending toward an inner portion of the LGP;
a receiving container comprising a bottom plate receiving the point light sources and the LGP and a side wall formed at an edge of the bottom plate; and
a protrusion disposed in the receiving container and protruding into the fixing groove,
wherein a length of the fixing groove along the first direction is greater than a width of the protrusion along a second direction that is substantially perpendicular to the first direction.

2. The backlight assembly of claim 1, wherein the fixing groove comprises two inner faces which are each extended from the side surface of the LGP toward the inner portion thereof and which face each other, and a connection face which connects to the two inner faces.

3. The backlight assembly of claim 2, wherein the connection face has a curved surface.

4. The backlight assembly of claim 3, wherein the protrusion comprises an exterior face and a portion of the exterior face of the protrusion contacts the connection face of the fixing groove.

5. The backlight assembly of claim 1, further comprising a printed circuit board ("PCB") comprising a point light source disposing portion in which the point light sources are disposed and an extending portion extending from the point light disposing portion along the second direction,
wherein the protrusion is fixed at an end portion of the extending portion.

6. The backlight assembly of claim 5, wherein the protrusion comprises a flat shaped elastic member having a base portion formed at a first surface of the PCB and a first protruding portion and a second protruding portion that each extend from the base portion along a direction of the inner faces, respectively.

7. The backlight assembly of claim 6, wherein the first protruding portion and the second protruding portion are disposed to face with each other, and portions of the first and second protruding portions contact with the inner faces.

8. The backlight assembly of claim 2, wherein the protrusion comprises an elastic member on an exterior face thereof, and a first end portion of the elastic member contacts an interior face of the fixing groove.

9. The backlight assembly of claim 1, wherein a length of the protrusion along the first direction is smaller than a length of the fixing groove along the first direction.

10. The backlight assembly of claim 5, further comprising a reflection plate disposed between the PCB and a first face of the LGP,
   wherein the reflection plate has a hole through which the protrusion penetrates.

11. The backlight assembly of claim 5, wherein the PCB further comprises a metal support structure in which the protrusion is formed therethough.

12. The backlight assembly of claim 11, wherein the metal support structure comprises:
   a horizontal portion overlapped with a light reflection face of the LGP; and
   a vertical portion extending from the horizontal portion to be overlapped with the side surface of the LGP.

13. The backlight assembly of claim 1, further comprising a light source module cover disposed at a rear surface of a light source module including a plurality of the point light sources,
   wherein the bottom plate of the receiving container supports the light source module cover and the LGP.

14. The backlight assembly of claim 13, wherein a face of the light source module cover on which a plurality of the point light sources are mounted is arranged in parallel with each other to face the light incident face of the LGP.

15. The backlight assembly of claim 1, wherein the protrusion is supported in the receiving container to be movable independently from the bottom plate of the receiving container.

* * * * *